United States Patent
Calomme et al.

(10) Patent No.: US 12,447,176 B2
(45) Date of Patent: Oct. 21, 2025

(54) SILICIC ACID FORMULATION AND USE THEREOF

(71) Applicant: Bio Minerals N.V., Destelbergen (BE)

(72) Inventors: Mario Remi Yvonne Calomme, Edegem (BE); Patrick Wilfried Godfried Van De Sompele, Knokke-Heist (BE); Richard Alan Passwater, Berlin, MD (US)

(73) Assignee: Bio Minerals N.V., Destelbergen (BE)

( * ) Notice: Subject to any disclaimer, the term of this patent is extended or adjusted under 35 U.S.C. 154(b) by 0 days.

(21) Appl. No.: 15/733,726

(22) PCT Filed: Apr. 8, 2019

(86) PCT No.: PCT/EP2019/058802
§ 371 (c)(1),
(2) Date: Oct. 6, 2020

(87) PCT Pub. No.: WO2019/193200
PCT Pub. Date: Oct. 10, 2019

(65) Prior Publication Data
US 2021/0023125 A1    Jan. 28, 2021

(30) Foreign Application Priority Data
Apr. 6, 2018 (EP) .................. 18166152

(51) Int. Cl.
*A61K 33/00* (2006.01)
*A61K 9/48* (2006.01)
*A61K 47/44* (2017.01)

(52) U.S. Cl.
CPC ............ *A61K 33/00* (2013.01); *A61K 9/4816* (2013.01); *A61K 9/485* (2013.01); *A61K 47/44* (2013.01)

(58) Field of Classification Search
CPC ........ A61K 33/00; A61K 47/02; A61K 47/44; A61K 8/11; A61K 8/25; A61K 8/731;
(Continued)

(56) References Cited

U.S. PATENT DOCUMENTS

| 3,515,591 A | 6/1970 | Klose |
| 4,702,919 A | 10/1987 | Kitamori |

(Continued)

FOREIGN PATENT DOCUMENTS

| EP | 0743922 A1 | 11/1996 |
| EP | 1391426 A1 | 2/2004 |

(Continued)

OTHER PUBLICATIONS

Biyani, MK. (Choosing Capsules: A Primer; [online] retrieved on Apr. 13, 2022 from: Choosing Capsules: A Primer (pharmtech.com); 2017:9 pages). (Year: 2017).*

(Continued)

*Primary Examiner* — Ernst V Arnold
(74) *Attorney, Agent, or Firm* — McDonnell Boehnen Hulbert & Berghoff LLP

(57) ABSTRACT

The capsule comprises a capsule shell and filled With an acidic liquid formulation comprising stabilized silicic acid, wherein the capsule shell comprises a polysaccharide and/or a polysaccharide derivative. The stabilization may be achieved with a quaternary ammonium compound. The capsule can be part of a capsule-in-capsule product, wherein the outer capsule contains furthermore a composition such as an oil. The capsule may be applied as a dietary supplement or as a medicament.

24 Claims, 1 Drawing Sheet

(58) Field of Classification Search
CPC . A61K 8/732; A61K 9/08; A61K 9/10; A61K 9/4816; A61K 9/485; A61K 47/36; A61Q 19/08; A61Q 3/00; A61Q 7/00; A23V 2002/00; A23V 2250/1628; A23V 2250/50; A23P 10/30; A23P 17/00; A23P 19/00

See application file for complete search history.

(56) References Cited

U.S. PATENT DOCUMENTS

| | | | |
|---|---|---|---|
| 4,985,405 | A | 1/1991 | Gueyne et al. |
| 8,771,757 | B2 * | 7/2014 | Vanden Berghe ...... A61P 19/00 424/724 |
| 8,795,720 | B2 * | 8/2014 | Madit ................. A61K 9/4858 424/455 |
| 8,852,631 | B2 * | 10/2014 | Cade ....................... B29C 41/14 264/306 |
| 9,655,860 | B2 | 5/2017 | Cade et al. |
| 11,878,031 | B2 | 1/2024 | Calomme et al. |
| 2005/0196434 | A1 | 9/2005 | Brierre |
| 2005/0220865 | A1 | 10/2005 | Koleng |
| 2010/0068294 | A1 | 3/2010 | Van Den Berghe |
| 2010/0303737 | A1 | 12/2010 | Hurtig |
| 2012/0039964 | A1 | 2/2012 | Beck |
| 2016/0324766 | A1 | 11/2016 | Stettler et al. |
| 2018/0185432 | A1 | 7/2018 | Alamdari |
| 2021/0023125 | A1 | 1/2021 | Calomme et al. |

FOREIGN PATENT DOCUMENTS

| | | | | |
|---|---|---|---|---|
| EP | 1551763 | B1 | 4/2009 | |
| EP | 3117822 | A1 | 1/2017 | |
| EP | 3396065 | A1 | 10/2018 | |
| EP | 3549578 | A1 | 10/2019 | |
| JP | 2005229653 | A | 9/2005 | |
| JP | 2006117601 | A | 5/2006 | |
| JP | 2008-245538 | A | 10/2008 | |
| WO | WO-9521124 | A1 * | 8/1995 | ............. A23K 20/28 |
| WO | 98/47519 | A1 | 10/1998 | |
| WO | 2004-016551 | A1 | 2/2004 | |
| WO | 2006082842 | A1 | 8/2006 | |
| WO | 2007035431 | A2 | 3/2007 | |
| WO | WO-2008072001 | A2 * | 6/2008 | ............. B01J 13/02 |
| WO | 2009018356 | A1 | 2/2009 | |
| WO | 2009127256 | A1 | 10/2009 | |
| WO | 2010092925 | A1 | 8/2010 | |
| WO | 2012032364 | A1 | 3/2012 | |
| WO | 2012035364 | A1 | 3/2012 | |
| WO | 2012/102198 | A1 | 8/2012 | |
| WO | 2013/133781 | A1 | 9/2013 | |
| WO | 2014006532 | A1 | 1/2014 | |
| WO | 2016/201449 | A1 | 12/2016 | |
| WO | 2019193200 | A1 | 10/2019 | |
| WO | 2020/070300 | A1 | 4/2020 | |
| WO | 2020/094886 | A1 | 5/2020 | |

OTHER PUBLICATIONS

BioSil Liquid Capsules ([online] retrieved on Apr. 13, 2022 from: https://www.amazon.com/Capsules-Natural-Factors-Collagen-Generator/dp/B07ZMHLKP9; 2019:12 pages) (Year: 2019).*

Lorna Vanderhaeghe [online] retrieved on Jun. 30, 2023 from: https://www.naturallyhealthyniagara.com/pdf/ProductInformationSheet-BioSil.pdf; available Sep. 27, 2017; 3 pages. (Year: 2017).*

BioSil ch-OSA Advanced Collagen Generator, 30 Vegetarian Capsules [online] retrieved on Jun. 30, 23 from: https://www.iherb.com/pr/biosil-ch-osa-advanced-collagen-generator-30-vegetarian-capsules/23156; Date First Available Mar. 2010; 8 pages. (Year: 2010).*

Capsugel's Stef Vanquickenborne (p. 2 of 6 in: Manufacturing Chemist, [online], retrieved on Nov. 28, 2023 from: https://www.manufacturingchemist.com/news/article_page/Hypromellose_is_changing_the_role_of_capsules/131609; Jul. 14, 2017; 6 pages). (Year: 2017).*

Sigma Aldrich ([online] retrieved on Mar. 21, 2024 from: https://www.sigmaaldrich.com/US/en/product/mm/841774; 2 pages). (Year: 2024).*

Calomme, M.R., et al., "Supplementation of Calves with Stabilized Orthosilicic Acid. Effect on the Si, Ca, Mg, and P Concentrations in Serum and the Collagen Concentration in Skin and Cartilage", Biol. Trace Elem. Res., Feb. 1997, vol. 56(2), pp. 153-165.

Calomme, M., et al., "Partial Prevention of Long-Term Femoral Bone Loss in Aged Ovariectomized Rats Supplemented with Choline-Stabilized Orthosilicic Acid", Calcif Tissue Int., Apr. 2006, vol. 78(4), pp. 227-232, Epub Apr. 13, 2006.

Chiwele, I., et al., The Shell Dissolution of Various Empty Hard Capsules, Chem. Pharm. Bull., Jul. 2000, vol. 48 (7), pp. 951-956.

Geusens, P., et al., "A 12-Week Randomized, Double-Blind, Placebo-Controlled Multicenter Study of Choline-Stabilized Orthosilicic Acid in Patients with Symptomatic Knee Osteoarthritis", BMC Musculoskeletal Disorders, Jan. 2017, vol. 18(2), pp. 1-12.

Iler, R.K., "The Chemistry of Silica", John Wiley & Sons, NY, 1979, pp. 1-2, 10-15 and 172-189.

Jugdaohsingh, R., et al., "Oligomeric but not Monomeric Silica Prevents Aluminum Absorption in Humans", Am. J. Clin. Nutr., Apr. 2000, vol. 71(4), pp. 944-949.

Rabadiya, et al., "A Review: Capsule Shell Material from Gelatin to Non-Animal Origin Material", International Journal of Pharmaceutical Research and Bio-Science, 2013, vol. 2(3), pp. 42-71.

Wickett, R.R., et al., "Effect of Oral Intake of Choline-Stabilized Orthosilicic Acid on Hair Tensile Strength and Morphology in Women with Fine Hair", Arch. Dermatol. Res., Oct. 2007, vol. 299, pp. 499-505.

"Choline-Stabilised Orthosilicic Acid Added for Nutritional Purposes to Food Supplements", The EFSA Journal, 2009, vol. 948, pp. 1-23.

Jivan, et al., "Preparation of cold water-soluble potato starch and its characterization." Journal of food science and technology 51, No. 3 (2014): 601-605.

International Search Report for International Patent Application No. PCT/EP2019/058802, dated Jun. 24, 2019, pp. 1-4.

Written Opinion from the International Searching Authority, for International Patent Application No. PCT/EP2019/058802, dated Jun. 24, 2019, pp. 1-7.

"Advanced Collagen Generator Supplement", Feb. 5, 2015. [Retrieved from www.gnpd.com, Database Accession No. 2931269].

"Food Supplement", Mar. 3, 2010. [Retrieved from www.gnpd.com, Database Accession No. 1279883].

"E & Selenium Food Complex", Oct. 12, 2009. [Retrieved from www.gnpd.com, Database Accession No. 1192260].

"Bone Collagenizer Ultra Capsules", Oct. 30, 2017. [Retrieved from www.gnpd.com, Database Accession No. 5196303].

"Multi Vitamin Bar", Mar. 16, 2015. [Retrieved from www.gnpd.com, Database Accession No. 3034249].

PCT International Search Report and Written Opinion, PCT International Application No. PCT/EP2019/058802, dated Jun. 24, 2019.

Barel, A. et al., "Effect of oral intake of choline-stabilized orthosilicic acid on skin, nails and hair in women with photodamaged skin," Archives of Dermatological Research, vol. 297, No. 4, pp. 147-153, Oct. 1, 2005.

Spector, Tim D. et al., "Choline-stabilized orthosilicic acid supplementation as an adjunct to Calcium/Vitamin D3 stimulates markers of bone formation in osteopenic females: a randomized, placebo-controlled trial," BMC Musculoskeletal Disorders, vol. 9, No. 1, Jun. 11, 2008.

Barel, A. et al., "Effect of oral intake of choline-stabilized orthosilicic acid on skin, nails and hair in women with photodamaged skin," Archives of Dermatological Research, vol. 297, No. 4, Oct. 1, 2005.

Spector, T.D., et al., "Choline-Stabilized Orthosilicic Acid Supplementation as an Adjunct to Calcium/Vitamin D3 Stimulates Markers of Bone Formation in Osteopenic Females: A Randomized, Placebo-Controlled Trial", BMC Musculoskeletal Disorders, Jun. 11, 2008, vol. 9(1).

Teughels, W., et al., "Clinical and Microbiological Effects of Lactobacillus Reuteri Probiotics in the Treatment of Chronic Periodontitis: A Randomized Placebo-Controlled Study", Journal of Clinical Periodontology, Sep. 15, 2013, vol. 40(11), pp. 1025-1035.

(56) References Cited

OTHER PUBLICATIONS

International Search Report from the European Patent Office, mailing date Dec. 17, 2019, for International Application No. PCT/EP2019/076944, pp. 1-5.
Written Opinion of the International Searching Authority, mailing date Dec. 17, 2019, for International Application No. PCT/EP2019/076944, pp. 1-11.
Examination Report issued in Indian Patent Application No. 202027048003 dated Jul. 7, 2022.
Examination Report issued in European Patent Application No. 18166152.1 dated May 31, 2022.
Office Action dated Feb. 15, 2023 issued in Israeli Patent Application No. 277892 (4 pages).
Garrison, S.R., et al., "Magnesium for Skeletal Muscle Cramps", Cochrane Database of Systematic Reviews, Sep. 12, 2012, Issue 9, Art. No. CD009402.
Jurkic, L.M., et al., "Biological and Therapeutic Effects of Ortho-Silicic Acid and Some Ortho-Silicic Acid-Releasing Compounds: New Perspectives for Therapy", Nutrition & Metabolism, Biomed Central, London, GB, Jan. 8, 2013, vol. 10(1), pp. 1-12.
Katzberg, H.D., et al., "Assessment: Symptomatic Treatment for Muscle Cramps (An Evidence-based Review): Report of the Therapeutics and Technology Assessment Subcommittee of the American Academy of Neurology", Neurology, Feb. 23, 2010, vol. 74(8), pp. 691-696.
Leal de Araüjo, C.A., et al., "Oral Magnesium Supplementation for Leg Cramps in Pregnancy—An Observational Controlled Trial", PLoS One, Jan. 10, 2020, vol. 15(1), e0227497, pp. 1-8.
Nielsen, F.H., "Update on the Possible Nutritional Importance of Silicon", Journal of Trace Elements in Medicine and Biology, Oct. 2014, vol. 28(4), pp. 379-382.
Ozgoli, G., et al., "A Randomized, Placebo-Controlled Trial of *Ginkgo biloba* L. in Treatment of Premenstrual Syndrome", The Journal of Alternative and Complementary Medicine, 2009, vol. 15(8), pp. 845-851.
"Scientific Opinion on Dietary Reference Values for Magnesium", EFSA Journal, 2015, vol. 13(7), p. 4186.
PCT International Search Report and Written Opinion, Application No. PCT/EP2020/053912, mailed May 4, 2020, 13 pages.
Nat Med, "OsteoTherea by ProTherea, Inc.", retrieved 2024 from: https://naturalmedicines.therapeuticresearch.com/databases/commercial-products/commercial-product.aspx?cpid=115395, 1 page (2024).
Study.com, "What is the percent composition of silicon dioxide?", retrieved Feb. 27, 2024. Retrieved from: https://homework.study.com/explanation/what-is-the-percent-com position-of-sillicon-dioxide.htm 1#:~:text=Answer%20and%20 Explanation %3A, oxygen %20and % 2046.75%20percent%20silicon, 1 page (2024).
Pishro Chem, "The Role of Stearic Acid in Medicine", 2 pages (2023).
Dominguez-Robles et al., "Lignin and Cellulose Blends as Pharmaceutical Excipient for Tablet Manufacturing via Direct Compression", Biomolecules, vol. 9(423), pp. 1-17. (2019).
Stewart, K., "Klaire Labs Branding Merger With ProThera and Complementary Prescriptions", Today's Practitioner, pp. 1-2 (2017).
Abdulla, A.J., et al., "Leg Cramps in the Elderly: Prevalence, Drug and Disease Associations", Int. J. Clin Pract., Oct.-Nov. 1999, vol. 53(7), pp. 494-496, (Abstract only).
Layzer, R.B., et al., "The Origin of Muscle Fasciculations and Cramps", Muscle Nerve, Nov. 1994, vol. 17(11), pp. 1243-1249, (Abstract only).
Young, G., "Leg Cramps", Clinical Evidence, May 13, 2015, vol. 5(1113), pp. 1-20.
Rowe, R. C. et al., "Handbook of Pharmaceutical Excipients," Fifth Edition, Pharmaceutical Press, pp. 132-135 and 442-444 (2006).
Garrison, S. R. et al., "Magnesium for skeletal muscle cramps (Review)," Cochrane Database of Systematic, Issue 9, pp. 1-54 (2012).
Rowe, R. C. et al., "Handbook of Pharmaceutical Excipients: Colloidal Silicon Dioxide," Fifth Edition, Pharmaceutical Press, pp. 188-191 (2006).
"Hypromellose is changing the role of capsules," Manufacturing Chemist, 5 pages (2017) (https://www.manufacturingchemist.com/news/article_page/Hypromellose_is_changing_the_role_of_capsules/131609; retrieved Apr. 12, 2022).
Kendall et al. The Role of Polymers in Solid Oral Dosage Forms, in "Polymers in Drug Delivery", CRC Press: Boca Raton, 2019, pp. 35-40.

\* cited by examiner

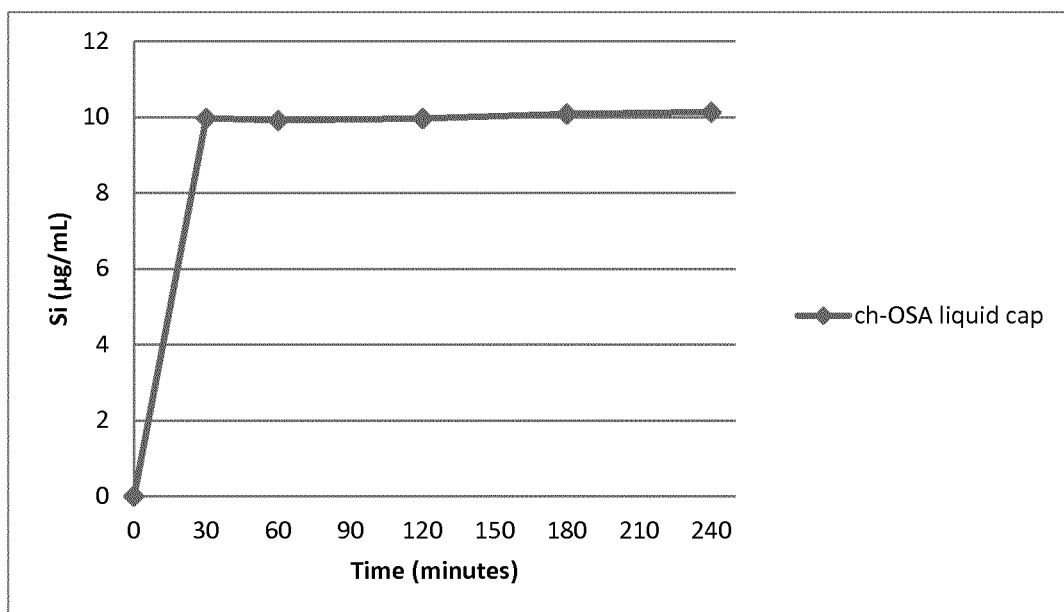

SILICIC ACID FORMULATION AND USE THEREOF

CROSS-REFERENCE TO RELATED APPLICATION

The present application is a national stage entry of PCT/EP2019/058802 filed on Apr. 8, 2019, which claims priority to EP 18166152.1, filed on Apr. 6, 2018, the contents of each of which are hereby incorporated by reference.

FIELD OF THE INVENTION

The invention relates to a silicon supplement comprising stabilized silicic acid, and to the use thereof as a medicament or a food supplement. The invention further relates to a dosage form comprising stabilized silicic acid for use as a medicament.

BACKGROUND OF THE INVENTION

The mineral silicon is present in beverages and water in the form of orthosilicic acid (OSA). OSA is chemically stable in dilute concentrations i.e. $<10^{-3}$ M (Iler 1979). At higher concentrations, polycondensation of OSA occurs resulting in the formation of oligomers and polymers. Absorption studies in man indicate that only OSA is bioavailable whereas it polycondensated forms are not absorbed (Jugdaohsingh et al. 2000). The limited stability of OSA and its rapid conversion into non-bioavailable species, which is highly pH-dependent, is problematic for optimal nutrition moreover as other minerals and nutrients can trigger polycondensation.

Orthosilicic acid may be stabilized by means of a stabilizer, suitably chosen from the group of quaternary ammonium compounds and amino acids, sources of amino acids or combinations thereof. One known stabilizer is a choline compound. In practice, some oligomerisation is observed. This oligomerisation however does not convert the orthosilicic acid into silica, but rather into oligomers which may be converted (particularly by hydrolysis) to orthosilicic acid in the gastro-intestinal tract. Orthosilicic acids and its oligomers—which are in a form or may be converted to a form that can be absorbed from the gastro-intestinal tract into the blood circulation—is hereinafter referred to as stabilized silicic acid.

Both liquid and solid formulations of stabilized silicic acid have been invented by the present applicant and developed into commercially available products. A liquid formulation is disclosed in EP0743922 and a solid version, made by means of extrusion-spheronisation technology, is disclosed in EP1551763. These products have been tested in a variety of clinical tests in which beneficial results were found on bone, cartilage, hair, nails and skin. It has been found that after oral intake of stabilized silicic acid, the ingested silicon compound is primarily found as orthosilicic acid in blood and urine.

In developing effective products, consumer compliance is almost as important as the direct bioavailability. If a consumer takes the product not as often as foreseen, the therapeutically effective concentration in the body cannot be reached, hence its beneficial impact on bones, cartilage, nails, skin and hair will not occur. To this respect, the stabilization of orthosilicic acid by a quaternary ammonium compound such as choline is technologically cumbersome. In fact, such compounds give a bad odor and a very bitter, fishy taste to a liquid preparation which makes it difficult for consumers to swallow. A solid formulation does not have the said disadvantage, but the effective silicon concentration is low therein. The extrusion-spheronization results in a plurality of pellets that are packaged into a capsule. It overall comprises a large mass of carrier material, such as microcrystalline cellulose. As a consequence, the capsule size needed for an clinically effective dose is very large. Such big capsules are not preferred.

It would therefore be desirable to create another formulation of stabilized silicic acid, which is dietary and/or pharmaceutically effective (and wherein any oligomers are converted into absorbable form of orthosilicic acid) and leads to a good customer or patient compliance. However, this is not simple, as stabilized-OSA is a technologically difficult product. First of all, it is highly hygroscopic, in view of the presence of the quaternary ammonium compound such as choline. Secondly, the liquid form of concentrated stabilized-OSA that forms the basis for both liquid and solid formulations is acidic, with a pH around 1, so as to prevent polycondensation.

SUMMARY OF THE INVENTION

It is therefore an object of the invention to provide a further formulation of stabilized silicic acid which results in absorption through the mucus, optionally after partial hydrolysis in the gastrointestinal tract, and which also is effective to obtain high customer or patient compliance.

It is another object of the invention to provide a method of preparation such a formulation.

It is again a further object of the invention to provide a method of prevention, inhibition and treatment of bone-loss and cartilage degeneration related diseases, loss of hair and nail quality and skin ageing diseases that is clinically effective and beneficial to obtain good compliance, as well as a formulation for use therein.

It is another object of the invention to provide a formulation of stabilized silicic acid for use as a medicament, more particularly a medicament in the prevention, inhibition and treatment of bone-loss, cartilage degeneration, loss of hair and nail quality and skin ageing diseases.

According to a first aspect, the invention provides a capsule comprising a capsule shell and filled with an acidic liquid formulation comprising stabilized silicic acid, wherein the capsule shell comprises a polysaccharide or a polysaccharide derivative.

According to a second aspect, the invention provides a method of preparation of a capsule as claimed in any of the preceding claims, comprising the steps of:
 Preparing an acidic liquid formulation of stabilized silicic acid;
 Filling a capsule shell with the liquid formulation, and
 Sealing the capsule shell to obtain said capsule.

According to a third aspect, the invention provides the capsule, which is a silicon supplement, of the invention for use as medicament, more particularly as a medicament in the prevention, inhibition or treatment of bone-loss, cartilage degeneration, loss of hair and nail quality and skin ageing diseases.

According to further aspects, the invention relates to the use of the silicon supplement of the invention in the prevention, inhibition or treatment of bone-loss, cartilage degeneration, loss of hair and nail quality and skin ageing diseases and/or as a food supplement.

According to again a further aspect, the invention relates to a capsule product comprising at least one first, inner capsule present within a second, outer capsule, wherein the capsule of the invention is present as the first capsule and wherein the outer capsule further contains a dietary and/or pharmaceutically acceptable composition.

According to another aspect, the invention relates to an acidic liquid formulation of stabilized silicic acid, further comprises a rheological additive chosen from an amorphous silica, phosphoric acid and/or salts thereof and triglycerides. It has been surprisingly found in experiments leading to the invention that stabilized silicic acid turns out stable in capsules comprising a capsule shell of polysaccharide or polysaccharide derivative. This is highly surprising, as such capsules are typically not stable in combination with an liquid formulation comprising water, see Chiwele et al (2000). In fact, capsules are designed so that they open in an aqueous acid environment, such as the stomach.

In a preferred embodiment, the liquid formulation has a pH in the range of 0 to 2.5, more preferably 0.5 to 2.0, such as 0.8 to 1.3. Experimental data showed unexpectedly a high stability of such a liquid formulation in capsules comprising a capsule shell of polysaccharide or polysaccharide derivative, which the same formulation in gelatine capsules were found to give leakage. Both below and above said range the liquid formulation is at a higher risk of polycondensation.

In a further preferred embodiment, the stabilized silicic acid of the liquid formulation comprises a quaternary ammonium compound as a stabilizer. Particularly good results have been observed with a choline compound, such as choline chloride. The presence of alternative choline compounds, such as choline acetate and choline bitartrate, choline hydroxide is however not excluded. The quaternary ammonium compound is charged, which is deemed to have a positive impact on the stability of the silicic acid. Furthermore, the use of a charged compound may well contribute to the observed stability of the capsule in accordance with the present invention. Preferably, the stabilizer is present in an amount of at least 15 wt % of the liquid formulation. The amount of stabilizer is herein defined on the basis of the quaternary ammonium ion without counter-ion, thus choline rather than choline chloride.

In a further preferred embodiment, particularly suitable in combination with the use of a quaternary ammonium compound as a stabilizer, the stabilized silicic acid comprises water. Surprisingly, it was found that no significant water migration between the formulation and the capsule shell occurs. If water would migrate from the capsule shell into the stabilized orthosilicic acid formulation, the capsule would become brittle. This does not happen, as observed in experiments with a duration of 3 months and 9 months. If water would migrate to the capsule shell, the capsule shell would start to decompose, which does not happen as observed in experiments. In a preferred implementation, the water is present in the stabilized silicic acid in an amount corresponding to at most 30 wt % of the formulation. In a more preferred embodiment, the water is present in amount in the liquid formulation of at most 20 wt % water, such as at most 15 wt % water.

Preferably, in the invention, the stabilized silicic acid substantially comprises oligomers and/or monomers of orthosilicic acid. The oligomers are for instance oligomers comprising less than 1000 monomers, preferably less than 100 monomers per molecule. More preferably, the oligomers are such that at least 80% and preferably at least 90% of the silicon atoms are herein bonded to at most 3 other silicon atoms via a silicon-oxygen-silicon bridge. The term substantially herein suitably refers to at least 95 wt %, preferably at least 98 wt %, more preferably at least 99 wt %.

In a further embodiment, the formulation has a viscosity in the range of $0.08 \cdot 10^3$ to $2.0 \cdot 10^3$ mPas. A viscosity lower than said minimum of 80 mPas tends to lead to leakage of the capsules, whereas a viscosity above said maximum leads to incorrect filling of the capsules. The viscosity is herein measured with a Brookfield viscometer and a thermostat water bath, 25° C.

In an implementation hereof, the viscosity is modified by addition of a rheological additive. This additive is a compound that is added to the formulation, suitably in solid form, and then dissolves therein or is finely dispersed therein. A fine dispersion is in this context particularly a dispersion with an average particle size of at most 1 micron. Such fine dispersions are also known as colloidal solutions or colloidal suspensions. In this embodiment, the additive is suitably added in an amount up to 10 wt %, for instance 3-6 wt %. The additive is suitably chosen from the group of hydroxylpropyl methylcellulose (HPMC) and other cellulose derivatives, silicon dioxide particles, more preferably amorphous silica particles, phosphoric acid and salts thereof, triglycerides, xanthan gum and other gums, stearates such as aluminum and magnesium stearates.

Suitable amorphous silica articles are for instance fumed silica particles. More preferably, the silica particles have a hydrophilic surface rather than being treated to render the surface hydrophobic. The phosphoric acid or salt thereof may well be added as a salt of a hypophosphate, such as calcium dibasic phosphate, which will then react to phosphoric acid with acid present in the formulation. The phosphoric acid may be present as orthophosphoric acid, but it is not excluded that polymerization occurs. The triglycerides are suitably triglycerides of fatty acids. More preferably the triglycerides are triglycerides of fatty acids with a chain length in the range of 6 to 14 carbon atoms—also known as medium chain triglycerides. The rheological additive is suitably added to the formulation after the preparation of the stabilized silicic acid. The liquid formulation may furthermore contain a diluent in addition to the rheological additive.

In a further implementation, the liquid formulation may comprise a diluent. It has been found advantageous that the use of such a diluent does not lead to change the pH of the liquid formulation more than marginally. The diluents is suitably chosen from the group of glycerol, polyethylene glycol, polypropylene glycol. Therewith, they do not undermine the stability of the liquid formulation. The weight content of the one or more diluents in the liquid formulation may be up to 80 wt %. However, it is preferred that the diluents is present in an amount of at most 20 wt %. More preferably, the acidic liquid formulation comprises the diluent in an amount of at most 10 wt % or is even free of diluent. If the amount of diluents is less than 20 wt %, and particularly less than 10 wt % or if the liquid formulation is free of diluents, the liquid formulation preferably comprises the rheological additive as specified hereinabove. The advantage of filling the capsule with undiluted liquid formulation is that it provides the most far reaching size reduction, while the stability of the stabilized silicic acid does not decrease.

The polysaccharide or polysaccharide derivative material of the capsule shell is preferably selected from the group of cellulose, cellulose derivative, including alkylcellulose, carboxyalkylcellulose, hydroxyalkylcellulose, hydroxyalkylalkylcellulose, carboxyalkyl-alkylcelluloses and derivatives thereof, starch, modified starch, such as starch ethers and oxidized starches, carboxymethyl starches, hydroxyalkylated starches and succinated starches, pullulan, dextran and/or combinations thereof.

More preferred optionally derivative polysaccharide materials are chosen from the group of hydroxyalkylcelluloses and hydroxyalkylalkylcelluloses. Alkyl is one or more of C1-C4 alkyl, and is more preferably linear alkyl. Most preferably, the optionally derivative polysaccharide is chosen from the group of hydroxyethylcellulose, hydroxyethylmethylcellulose, hydroxypropylcellulose and hydroxypropylmethylcellulose, hydroxybutylmethylcellulose, hydroxyethyl cellulose ether, hydroxypropyl cellulose ether, hydroxyethylmethyl cellulose ether, hydroxyethylethyl cellulose ether, hydroxypropylmethyl cellulose ether and derivatives thereof, as well as mixtures thereof. Good results have been obtained with hydroxypropylmethylcellulose (HPMC) or derivatives. The presence of a hydroxyl-group on a substituent to the cellulose-unit may contribute to the stability of the liquid formulation.

The use of alternative celluloses and derivatives thereof is not excluded. Examples include methylcellulose, ethylcellulose, cellulose acetylphthalate, sodium carboxymethyl cellulose, methyl cellulose ether, as well as mixtures thereof and mixtures with any hydroxyalkylcellulose or hydroxyalkylalkylcellulose as specified hereinabove.

The polysaccharide derivatives is more preferably an acid-modified cellulose, alkylcellulose, hydroxyalkylcellulose or hydroxyalkylalkylcellulose, wherein the acid modification preferably results in one or more of a phthalate, succinate, acetate, maleate, trimellitate. The acid-modification thus results in the formation of esters between a hydroxyl group of the cellulose and the applied acid. Acid modification of hydroxyalkylcelluloses or hydroxyalkylalkyl celluloses is preferred. The term alkyl is herein defined as C1-C4 alkyl. Specific examples of such cellulose have been specified above.

As known in the art, a capsule typically comprises more than one piece. Usually, use is made of a two-piece capsule, regularly referred to as the body and the cap of the capsule. The term 'capsule shell' effectively refers to the shell of a capsule piece, for instance the shell of a capsule body. The capsule body will then be filled with the acidic liquid formulation. After the filling, the capsule cap, conventionally comprising a shell, is assembled to the cap. Thereafter the capsule body and the capsule cap are sealed to each other. However, the invention is not limited to the conventional capsule manufacturing and assembling techniques, and could for instance also be applied to single piece capsules comprising an aperture for filling, which single piece capsules are subsequently sealed without first assembling a second piece of the capsule. The filling of the capsules in the method of the present invention can be carried out in known manner. Preferably, the filling occurs at a temperature in the range of 20 to 40° C., for instance at room temperature, and most preferably without carrying out a heating step of the formulation and/or a cooling step of the formulation. The capsule with a capsule shell is more particularly a so-called hard capsule.

The capsule shell preferably contains the polysaccharide or polysaccharide derivative material (and/or the preferred examples thereof as hereinabove specified) in an amount from 90% to 99% by weight of the final capsule shell. The capsule shell may further contain a gelling agent as known in the art, for instance chosen from the group of alginic acid and its salts (for instance sodium, potassium and calcium salts), agar, carrageen, carob gum, and gellan gum. The choice of the gelling agent was not found to be critical. A capsule shell typically contains an enteric polymer and a film forming agent. The HPMC and/or its derivative may be both. The enteric polymer is for instance a polymer comprising acid groups. Then a HPMC derivative such as an acid-modified hydroxyalkylcellulose is applied. Examples of acids include maleic acid (anhydride), succinic acid, acetic acid, phthalic acid, trimellic acid. Preferred derivatives are hydroxypropyl methylcellulose acetate succinate or hydroxypropyl methylcellulose phthalate are deemed very suitable options, among other acid-modified HPMC derivatives. Preferably, any acid groups are carboxylic acid groups. The film forming agent is for instance chosen of HPMC, methylcellulose, gellan gum, carrageenan, and mixtures thereof, and preferably includes at least HPMC. In general, when the film forming agent is HPMC or methylcellulose, the ratio of the enteric polymer to the film-forming agent is in the range of 1.5 to 3.5, such as from 2.0 to 2.5.

Optionally the capsule shell is coated to change its dissolution properties, per example an enteric coating to make the capsule resistant to stomach acid. Coating agents commonly used are anionic polymethacrylates (copolymerisate of methacrylic acid and either methylmethacrylate or ethyl acrylate (Eudragit®), cellulose based polymers, e.g. cellulose acetate phthalate (Aquateric®) or polyvinyl derivatives, e.g. polyvinyl acetate phthalate (Coateric®).

In again a further implementation, the capsule shell is sealed by application of a solution of a polysaccharide such as hydroxypropyl methylcellulose in an alcohol.

In again a further implementation, the capsule shell has a size of at most size 0. More preferably, the capsule shell has a size of at most 1. The inventors believe without desiring to be bound thereto, that the stability of the stabilized ortho-silicic acid in the capsules decreases with an increasing capsule size. Capsules size type 01 or smaller (for instance type 2-5) are very suitable. The filled capsules are suitably packed in a primary packaging which protects the capsules against humidity. Preferred packaging materials are aluminum/aluminum (ALU/ALU) blisters or strips or high density polyethylene bottles (HDPE) with magnetic induced aluminum seal and desiccant sachet. In the case—as hereinafter discussed that an inner capsule and an outer capsule are present, the size referred to is the size of the inner capsule. In that embodiment, the size of the inner capsule is most suitably at most 1. The outer capsule may have any size as desired.

According to a preferred embodiment of the invention the capsule of the invention is present as an inner capsule within an outer capsule, which outer capsule further contains a dietary and/or pharmaceutically acceptable composition. The dietary and/or pharmaceutically acceptable composition (present within the outer capsule) is suitably a liquid, but it is in an alternative embodiment a solid, such as a powder or extruded particles. The presence of a dispersion, emulsion, cream, gel or other so-called semi-solid formulation as the dietary and/or pharmaceutically acceptable composition is not excluded. The term 'dietary and/or pharmaceutically acceptable composition' as used herein refers to a composition or formulation that meets standards specified for use in a specific application as known to the skilled person. Moreover, the composition is to be compatible with the inner capsule, so as to prevent leakage and/or early opening of the inner capsule. In the embodiment that said composition is or comprises a liquid, the said composition thereto preferably comprises a hydrophobic liquid, such as an oil. In the embodiment that said composition is or comprises a solid, the solid suitably comprises a dietary or pharmaceutically acceptable excipient as known per se to the skilled person. In one more preferred implementation, the said composition is substantially or entirely water-free, wherein the term 'substantially' herein refers to at most 5 wt %, more preferably at most 2 wt %. In a preferred implementation hereof, the acidic liquid formulation contained in the first capsule comprises diluent in an amount of at most 20 wt % and more preferably at most 10 wt %, and is preferably free of diluent.

The formation of such a capsule product comprises a first, inner capsule within a second, outer capsule is considered to offer highly advantageous options. First of all, the second, outer capsule and the dietary and/or pharmaceutically acceptable composition therein provide an additional encapsulation for the stabilized silicic acid, rendering it less susceptible to loss of moisture. This is beneficial for storage duration. Furthermore, it becomes feasible to use less demanding primary packaging.

Secondly, the second, outer capsule may be chosen so as to arrive at a predefined dosage release, such as a slow release capsule. In this manner, it can be achieved that the stabilized silicic acid is not released in the stomach, but only in the intestine or even the colon. That is deemed to enhance adsorption. Herein, the inner and/or outer capsule, and especially the inner capsule may be provided with an enteric coating.

Thirdly, the stabilized silicic acid may be combined with a further dietary of pharmaceutical ingredient. One suitable dietary ingredient is for instance an oil, such as an omega-3 oil and/or a fish oil. The latter oils typically contain as relevant nutrient polyunsaturated fatty acids. Three types of polyunsatured fatty acids involved in human physiology are α-linoleic acid, eicosapentaenoic acid and docosahexaenoic acid. As secondary medicaments, use can be made of agents against osteoporosis, osteopenia, for instance alendronate, zoledronic acid, risedronate, ibandronate, raloxifene, denosumab, and also selected vitamins, such as Vitamin E, Vitamin K. It will be understood that many more combination treatments are feasible. Furthermore, the further ingredient may be for instance chosen from polysaccharides, amino acids, peptides, vitamins and minerals or other therapeutically active compounds including antioxidants and compounds stimulating synthesis of connective tissue components.

It is observed for sake of completeness that the outer capsule may be either a soft or a hard capsule and may be based on one or more suitable capsule materials, such as gelatin, polysaccharide and polysaccharide derivatives, for instance starch, modified starch, cellulose and derivatives thereof. The size of the outer capsule is typically at least one size bigger than the inner capsule, but may well two or more sizes bigger. The number of inner capsules per outer capsules can be one or more than one, in dependence of the relative size of the inner and the outer capsule. A number of inner capsules per outer capsule is for instance 1-10, and more preferably 1-5.

The capsule may be applied as a pharmaceutical agent and as a dietary agent, i.e. a food supplement. It is primarily intended for use with human beings, although use with animals is not excluded. It is deemed beneficial that the stabilized silicic acid will be released from the capsule just by opening of the capsule. Hence, the capsule is also very suitable for patients with limited digestion, which are not fully capable of removing any solid carrier from the active ingredient (i.e. the stabilized silicic acid). Furthermore, it is deemed advantageous that the liquid formulation remains in its predefined form until release thereof from the capsule. When patients would mix droplets of the liquid formulation with a drink or dilute the droplets with water, there is a risk that the amount of OSA (and or its oligomers) reduces due a change in the pH and a concomitant polycondensation.

As a medicament, specific indications include bone loss, cartilage degeneration, loss of hair and nail quality and skin ageing and diseases. The medicament is deemed particularly suitable for the inhibition of these indications, while a preventive effect by maintaining an adequate silicon concentration has also been observed. Treatment is understood in the context hereof to support regeneration of bone, cartilage, hair and nail quality, at least partially. Specific diseases include osteopenia, osteoporosis, osteoarthritis, diseases in the field of rheumatology and dermatology.

The pharmaceutical or dietary agent is most preferably administered in a dose of 5-20 mg silicon per day, preferably 10 mg silicon per day, preferably for at least 6 months, more preferably at least 12 months.

While the present formulation is highly suitable for any type of patient group, particular benefits are expected for the patient groups of children and adolescents (up to 20 years, most preferably in the age group of 10-16 years and of elderly people of at least 50 years, such as with an age of at least 65 years. Preliminary investigations confirm that the compliance in these groups is increased.

According to a further preferred aspect, the invention provides an acidic liquid formulation of stabilized silicic acid, further comprising a rheological additive chosen from the group of amorphous silica, phosphoric acid and triglycerides. Preferably, the rheological additive is added in an amount of at most 10 wt % of the liquid formulation.

More preferably, the rheological additive is an amorphous silica, such as fumed silica. Such fumed silica includes primary particles with a mean particle size of to about 100 nanometer. These primary particles may be mutually adhered to aggregates. The aggregates can combine into agglomerates, wherein a bond between the aggregates is less strong than the bond between primary particles within the aggregate. As a consequence, the fumed silica easily disperses and may also dissolve in the acidic liquid formulation. It has been observed that the viscosity of the acidic liquid formulation can be effectively tuned by means of such rheological additive. Furthermore, it was observed that the rheological additive does not have a negative impact on the stability of the stabilized silicic acid.

More preferably, the stabilized silicic acid herein comprises a quaternary ammonium compound such as choline for stabilization. The stabilized silicic acid furthermore may comprise water. In a most preferred embodiment, the acidic liquid formulation of the present aspect comprises 2.5-4.0 vol % silicon, 45-60 wt % choline compound and 15-30 wt % water, as well as 2-8% fumed silica. The amount of choline compound is herein based on the choline ion without counter ion. The preferred counter ion is choline, but other counter ions may be present instead of or preferably in addition to chlorine. The amount of silicon is elementary silicon as measured with Atomic Absorption Spectrometry (AAS).

It is observed that preferred embodiments discussed in relation to one aspect also apply in corresponding manner to another aspect of the invention, even in the absence of an explicit discussion thereof in the foregoing.

It is furthermore observed that the term 'stabilized silicic acid' refers to a form of silicic acid, which is stabilized against polymerisation (also known as polycondensation) into silica (i.e. fully polycondensated). Hence the silicic acid is in monomeric form and/or in oligomeric form, such that hydrolysis of the oligomer into monomers occurs in the gastro-intestinal tract, particularly due to the acidic conditions residing therein. It is not excluded that the stabilized silicic acid is herein in so-called colloidal form. One known way to achieve stabilization resides in the use of a stabilizer compound, for instance based on a quaternary ammonium compound, and most preferably being choline.

The term 'polysaccharide' is well known in the art. It is defined as a saccharide compound with six or more repeating units. This is defined (by the USPTO as saccharide radicals attached to each other by glycosidic linkages. Typical polysaccharides are cellulose, starch, glycogen, chitin.

The term 'polysaccharide derivative' is defined as a polysaccharide wherein at least part of the repeating units is chemically modified with at least one modifier. Typical modifiers are alkyl-chain and substituted alkyl-chains, such as hydroxyalkyl and carboxyalkyl. The alkyl is herein preferably a lower alkyl, such as methyl, ethyl, propyl, butyl. The term 'cellulose derivative' is used in corresponding manner, as substituted versions of cellulose.

The term 'derivative' of HPMC or another individual cellulose, as referred to in the present application, refers to modified HPMC, for instance by modification with an organic acid, so as to improve processing properties. Such derivative may further be in the salt form, or in the form of the conjugated base.

BRIEF INTRODUCTION OF THE FIGURES

These and other aspects of the invention will be further elucidated with reference to the FIGURE, wherein:

FIG. 1 diagrammatically shows the dissolution of HPMC capsules, filled with a liquid mixture of choline-stabilized orthosilicic acid and glycerol.

EXAMPLES

Preparation Example 1

Choline chloride is treated with dry hydrochloric acid. Silicon (IV) tetrachloride is added to the formed choline solution (ratio SiCl4 versus choline chloride: 1 mol per 1 to 5 mol). The resulting solution is hydrolyzed by adding water (ice/ice water) while cooling within a temperature range of −10 to −30° C. The solution is neutralized by adding sodium hydroxide and maintaining the temperature below 0° C. The final pH is between 1-1.5. The pH was measured with a pH analyser commercially available from Stratos, type MS A405, Knick, equipped with a Memosens pH electrode with a Ag/AgCl2 reference system and liquid KCl electrolyte. Following purification by active carbon, the precipitate is removed by filtration together with the active carbon. The water concentration is reduced by distillation under vacuum until a preparation is obtained containing 2.5-4% silicon by volume and 65-80% choline chloride by weight and 15-30% water by weight. Precipitation which is formed during distillation is removed by filtration. Hard HPMC capsules were filled with the liquid, concentrated stabilized (ortho) silicic acid containing preparation using a pipette. Very small HPMC capsules can be used (type 3) to contain 190 mg of the liquid preparation. The filled capsules are sealed using a solution of HPMC (Pharmacoat 603) in ethanol.

Preparation Example 2

Choline chloride is treated with dry hydrochloric acid. Silicon (IV) tetrachloride is added to the formed choline solution (ratio SiCl4 versus choline chloride: 1 mol per 1 to 5 mol). The resulting solution is hydrolyzed by adding water (ice/ice water) while cooling within a temperature range of −10 to −30° C. The solution is neutralized by adding sodium hydroxide and maintaining the temperature below 0° C. The final pH is between 1-1.5, as measured with the pH sensor defined above. Following purification by active carbon, the precipitate is removed by filtration together with the active carbon. The water concentration is reduced by distillation under vacuum until a preparation is obtained containing 2.5-4% silicon by volume and 65-80% choline chloride by weight and 15-30% water by weight. Precipitation which is formed during distillation is removed by filtration. To the liquid, concentrated stabilized (ortho) silicic acid containing preparation, 5% silicon dioxide (Aerosil®) is added to increase the viscosity from 56 to 93 mPas. The obtained mixture is encapsulated into hard HPMC capsules. Very small HPMC capsules can be used (type 3) to contain 195 mg of the preparation. The filled capsules are sealed using a solution of HPMC (Pharmacoat 603) in ethanol.

Preparation Example 3

Choline chloride is treated with dry hydrochloric acid. Silicon (IV) tetrachloride is added to the formed choline solution (ratio SiCl4 versus choline chloride: 1 mol per 1 to 5 mol). The resulting solution is hydrolyzed by adding water (ice/ice water) while cooling within a temperature range of −10 to −30° C. The solution is neutralized by adding sodium hydroxide and maintaining the temperature below 0° C. The final pH is between 1-1.5. Following purification by active carbon, the precipitate is removed by filtration together with the active carbon. The water concentration is reduced by distillation under vacuum until a preparation is obtained containing 2.5-4% silicon by volume and 65-80% choline chloride by weight and 15-30% water by weight. Precipitation which is formed during distillation is removed by filtration. The liquid stabilized orthosilicic acid preparation is diluted with glycerol and the resulting mixture is encapsulated into hard HPMC capsules using a standard method. HPMC capsules (maximum size type 0) are filled with up to 0.66 g of the liquid mixture. The filled capsules are sealed using a solution of HPMC (Pharmacoat 603) in ethanol.

Preparation Example 4

Choline chloride is treated with dry hydrochloric acid. Silicon (IV) tetrachloride is added to the formed choline solution (ratio SiCl4 versus choline chloride: 1 mol per 1 to 5 mol). The resulting solution is hydrolyzed by adding water (ice/ice water) while cooling within a temperature range of −10 to −30° C. The solution is neutralized by adding sodium hydroxide and maintaining the temperature below 0° C. The final pH is between 1-1.5, as measured with the pH sensor defined above. Following purification by active carbon, the precipitate is removed by filtration together with the active carbon. The water concentration is reduced by distillation under vacuum until a preparation is obtained containing 2.5-4% silicon by volume and 65-80% choline chloride by weight and 15-30% water by weight. Precipitation which is formed during distillation is removed by filtration. To the liquid, concentrated stabilized (ortho) silicic acid containing preparation, 5% silicon dioxide (Aerosil®) is added to increase the viscosity from 56 to 93 mPas. The obtained mixture is encapsulated into hard HPMC capsules, type 3, which contain 195 mg of the preparation. The filled capsules are sealed using a solution of HPMC (Pharmacoat 603) in ethanol. Using a dual-station encapsulation device, the sealed type 3, concentrated stabilized (ortho) silicic acid containing capsules are put into type OO HPMC bodies which have been filled with 400 mg purified fish oil (48% EPA and 21% DHA in triglyceride form), followed by closing the filled outer bodies with OO type caps. The obtained "capsule-in-capsules" are sealed using a solution of HPMC (Pharmacoat 603) in ethanol.

Characterisation Example 1

Capsules filled with a stabilized silicic acid formulation as prepared in accordance with made with example 3 were subjected to disintegration testing. Use was made of elongated type O HPMC capsules supplied by Capsugel. The disintegration testing was carried out at different water concentrations, and was performed in accordance with standard Pharma Tests DTC-70 and DIST-3. Thereto, the capsules were first incubated for 24 hours in a dissolution system followed by 12 hours in a disintegration system (36 hours in total). The capsules were completely intact after the incubation i.e. no signs of disintegration were observed. Results are shown in Table 1.

TABLE 1

Incubation time of HPMC capsules filled with mixtures of stabilized silicic acid with glycerol as prepared in accordance with Preparation example 3.

| Composition choline-stabilized orthosilicic acid preparation | Incubation A of HPMC capsules Dissolution system (Pharma Test DTC-70), 37° C., 200 rpm, 24 hours Number of intact capsules | Incubation B of HPMC capsules Disintegration system (Pharma Test DIST-3), 37° C., 12 hours |
|---|---|---|
| 3% Si, 74% choline chloride, 23% water, pH 1 | 10 of 10 | 10 of 10 |
| 2% Si, 50% choline chloride, 15% water, 33% glycerol pH 1 | 10 of 10 | 10 of 10 |
| 1.5% Si, 38% choline chloride, 10.5% water, 50% glycerol pH 1 | 10 of 10 | 10 of 10 |

Characterisation Example 2

Capsules filled in accordance with Example 1 were subjected to chemical analysis. The capsules were thereto packed in HDPE bottles with a magnetic induced aluminum seal and a desiccant sachet and were stored at room temperature for 12 months. The capsules were tested using ETAAS and Colorimetry, as well as visually to determine the brittleness. The ETAAS is a measurement technique also referred to as Electrothermal Atomic Absorption Spectrometry. It is used to measure the amount of elemental silicon (with a 10% analytical error). The colorimetry experiments were carried out in accordance with the molybdenum blue method. This method is specific for orthosilicic (monomeric) acid, i.e. the test measures the amount of silicon in the form of orthosilicic acid (10% analytical error).

Results are provided in Table 2 and 3. It follows therefrom that the concentration of both elemental silicon and silicic acid remained stable. Also, capsules in aluminum/aluminum blisters which were stored at high relative humidity, showed no signs of polymerization after 12 months as documented by stable orthosilicic acid concentrations (table 3).

TABLE 2

Chemical stability of HPMC capsules type 3, filled with choline-stabilized orthosilicic acid, as packed in a HDPE bottle with a magnetic induced seal.

| | 190 mg choline-stabilized orthosilicic acid (100%); Type of primary packaging: HDPE bottle with magnetic induced seal. 25° C./40% RH | |
|---|---|---|
| Composition/Packaging | At start | After 12 months |
| ETAAS (mg Si/cap) | 5.1 | 5.4 |
| Colorimetry (mg Si/cap) | 5.1 | 5.3 |
| Brittleness (number of damaged caps/100 caps) | 0/100 | 0/100 |

TABLE 3

Chemical stability of HPMC capsules type 3, filled with choline-stabilized orthosilicic acid, as packed in ALU/ALU blisters.

| | 190 mg choline-stabilized orthosilicic acid (100%); Type of primary packaging: ALU/ALU blister | | | |
|---|---|---|---|---|
| | 25° C./60% RH | | 30° C./70% RH | |
| Composition/Packaging | At start | After 12 months | At start | After 12 months |
| ETAAS (mg Si/cap) | 5.1 | 4.9 | 5.1 | 5.0 |
| Colorimetry (mg Si/cap) | 5.1 | 5.2 | 5.1 | 5.4 |
| Brittleness (number of damaged caps/100 caps) | 0/100 | 0/100 | 0/100 | 0/100 |

Characterisation Example 3

2000 capsules as prepared in accordance with Preparation Example 2 were held under vacuum (under pressure of 200 mbar) for 2 hours at room temperature. None of the capsules were found to leak and the capsule weight did not change (<0.03%). The capsules were stored in an alu/alu sealed bag and the leak test was repeated after 1 month. Of the 2000 stored capsules none leaked and the capsule weight did not change (<0.03%).

Characterisation Example 4

Dissolution of filled capsules as prepared in accordance with Preparation Example 3 were provided in a buffer solution, which was a physiological salt solution. Results are shown in FIG. 1. These results show that the stabilized orthosilicic acid is very rapidly and completely released from the capsule in the dissolution medium without polycondensation.

Characterisation Example 5

Capsules as prepared in accordance with Preparation Example 3 were incubated at different temperatures and different relative humidities. The capsules were tested using ETAAS and Colorimetry, as well as visually to determine the brittleness. The ETAAS is a measurement technique also referred to as Electrothermal Atomic Absorption Spectrometry. It is used to measure the amount of elemental silicon (with a 10% analytical error). The colorimetry experiments were carried out in accordance with the molybdenum blue method. This method is specific for orthosilicic (monomeric) acid, i.e. the test measures the amount of silicon in the form of orthosilicic acid (10% analytical error).

Results are shown in Table 4 and 5. It is clear from these tables that both the physical integrity of the capsules and the stability of the choline-stabilized silicic acid is good. Neither does the capsule shell does become brittle nor was polycondensation of the stabilized silicic acid observed.

TABLE 4

Chemical and physical stability of HPMC capsules type 1, filled with a liquid mixture of choline-stabilized orthosilicic acid and glycerol, as prepared in accordance with Preparation Example 3.

| | 285 mg glycerol (60%) 190 mg choline-stabilized orthosilicic acid (40%) | | | |
|---|---|---|---|---|
| | 25° C./40% RH | | 25° C./60% RH | |
| Composition A | At start | After 3 months | At start | After 3 months |
| | Chemical stability | | | |
| ETAAS (mg Si/cap) | 4.9 | 4.7 | 4.9 | 4.7 |
| Colorimetry (mg Si/cap) | 4.8 | 4.8 | 4.9 | 4.8 |
| Brittleness (number of damaged caps/100 caps) | 0/100 | 0/100 | 0/100 | 0/100 |

TABLE 5

Chemical and physical stability of HPMC capsules type 1, filled with a liquid mixture of choline-stabilized orthosilicic acid and glycerol, as prepared in accordance with Preparation Example 3.

| | 125 mg glycerol (39.7%) 190 mg choline-stabilized orthosilicic acid (60.3%) | | | |
|---|---|---|---|---|
| | 25° C./40% RH | | 25° C./60% RH | |
| Composition B | At start | After 3 months | At start | After 3 months |
| | Chemical stability | | | |
| ETAAS (mg Si/cap) | 4.8 | 4.6 | 4.8 | 4.6 |
| Colorimetry (mg Si/cap) | 5 | 5 | 5 | 5 |
| Brittleness (number of damaged caps/100 caps) | 0/100 | 0/100 | 0/100 | 0/100 |

Characterisation Example 6

The Compositions A and B as specified in characterization example 5 were subjected to a compression test on a on TA XT Plus Texture analyzer (10% analytical error). The results are shown in Table 6 and 7.

TABLE 6

Compression test carried out on Composition A

| | 25° C./40% RH At start | After 3 months | 25° C./60% RH At start | After 3 months |
|---|---|---|---|---|
| Peak force (N) | 13.7 | 13.2 | 13.7 | 12.8 |
| Area to positive peak (N · sec) | 78.8 | 77.0 | 78.8 | 75.0 |

TABLE 7

Compression test carried out on Composition B

| | 25° C./40% RH At start | After 3 months | 25° C./60% RH At start | After 3 months |
|---|---|---|---|---|
| Peak force (N) | 12.1 | 12.8 | 12.1 | 13.2 |
| Area to positive peak (N · sec) | 71.0 | 75.0 | 71.0 | 76.0 |

Characterisation example 7

Tests carried out in characterization example 5 were repeated but now the formulations were encapsulated into larger capsules, i.e. type O rather than type 1. Moreover, the test was carried out during a longer period, i.e. 9 months rather than 3 months.

TABLE 8

Long term chemical and physical stability of HPMC capsules type O, filled with a liquid mixture of choline-stabilized orthosilicic acid and glycerol.

| | 460 mg glycerol (69.7%) 200 mg choline-stabilized orthosilicic acid (30.3%) 25° C./60% RH | |
|---|---|---|
| Composition C | At start | After 9 months |
| ETAAS (mg Si/cap) | 5.3 | 5.5 |
| Colorimtery (mg Si/cap) | 4.9 | 4.8 |
| Brittleness (number of damaged caps/100 caps) | 0/100 | 0/100 |

TABLE 9

Long term chemical and physical stability of HPMC capsules type O, filled with a liquid mixture of choline-stabilized orthosilicic acid and glycerol.

| | 130 mg glycerol (39;4%) 200 mg choline-stabilized orthosilicic acid (60.6%) 25° C./60% RH | |
|---|---|---|
| Composition D | At start | After 9 months |
| ETAAS (mg Si/cap) | 5.4 | 5.8 |
| Colorimetry (mg Si/cap) | 5.5 | 5.5 |
| Brittleness (number of damaged caps/100 caps) | 0/100 | 0/100 |

Comparative Example

Mixtures of liquid stabilized orthosilicic acid with glycerol as prepared in accordance with the protocol specified in Example 3 were used to fill directly soft- and hard gelatin capsules. The capsules were stored at room temperature in a packaging container (HDPE bottle). The soft gelatin capsules were stored during 1 week, and the state of the capsule was thereafter evaluated. The hard gelatin capsules were stored during 3 months, and the state of the capsule was thereafter evaluated. Results are shown in Table 1 and Table 2. It turned out that water migrated between respectively the gelatin shell, the stabilized silicic acid mixture and the air in the packaging container resulting in deformed and leaking capsules. This stability problem could not be solved by the use of specific, primary packaging material.

TABLE 10

Stability of soft gelatin capsules filled with ch-OSA containing mixtures with polyalcohols.

| Composition | Room temperature | 25° C., 60% RH |
|---|---|---|
| 100% ch-OSA (pH1.0) | 4 of 4 capsules very soft and damaged (partly solved, broken and swollen). | 4 of 4 capsules very soft and damaged (partly solved, broken and swollen). |
| 67% ch-OSA 33% glycerol | 4 of 4 capsules very soft and damaged (partly solved, broken and swollen). | 4 of 4 capsules very soft and damaged (partly solved, broken and swollen). |
| 67% ch-OSA 33% PEG 600 | 4 of 4 capsules very soft and damaged (partly solved, broken and swollen). | 4 of 4 capsules very soft and damaged (partly solved, broken and swollen). |
| Reference sample: 100% soybean oil | 4 of 4 capsules intact | 4 of 4 capsules intact |

For each composition 4 capsules were stored for 1 week at room temperature and in a stability cabinet with a controlled temperature and relative humidity (25° C., 60% RH). Capsules were visually inspected after 1 week.

TABLE 11

Stability of hard gelatin capsules filled with ch-OSA containing mixtures with polyalcohols.

| Composition | Petri disk | HDPE bottle |
|---|---|---|
| 100% ch-OSA (pH1.0) | 5 of 5 capsules damaged and deformed. | 5 of 5 capsules damaged and deformed. |
| 67% ch-OSA 33% glycerol | 4 of 5 capsules damaged and deformed. | 4 of 5 capsules damaged and deformed. |
| 67% ch-OSA 33% PEG 600 | 5 of 5 capsules damaged and deformed. | 4 of 5 capsules damaged and deformed. |
| Reference sample: 100% soybean oil | 5 of 5 capsules intact. | 5 of 5 capsules intact. |

For each composition 5 capsules were stored for 3 months at room temperature in an open petri disk or packed in a HDPE bottle. Capsules were visually inspected after 3 months.

REFERENCES

Iler 1979, The chemistry of silica, John Wiley & Sons, NY.
Jugdaohsingh et al. 2000, Oligomeric but not monomeric silica prevents aluminum absorption in humans. Am J Clin Nutr, 71, 944.
Calomme et al. 1997, Supplementation of calves with stabilized orthosilicic acid. Effect on the Si, Ca, Mg, and P concentrations in serum and the collagen concentration in skin and cartilage. Biol Trace Elem Res, 56, 153.
Calomme et al. 2006, Partial prevention of long-term femoral bone loss in aged ovariectomized rats supplemented with choline-stabilized orthosilicic acid. Calcif Tissue Int 78, 227.
Spector et al 2008, Choline-stabilized orthosilicic acid supplementation as an adjunct to calcium/vitamin D3 stimulates markers of bone formation in osteopenic females: a randomized, placebo-controlled trial. BMC Musculoskeletal Disorders, 9, 85.
Barel et al. 2005, Effect of oral intake of choline-stabilized orthosilicic acid on skin, nails and hair in women with photodamaged skin. Arch Dermatol Res, 297, 147.
Wickett et al. 2007, Effect of oral intake of choline-stabilized orthosilicic acid on hair tensile strength and morphology in women with fine hair. Arch Dermatol Res, 299, 499.
Geusens P, Pavelka K, Rovensky J, Vanhoof J, Demeester N, Calomme M, Vanden Berghe D (2017). A 12-week randomized, double-blind, placebo-controlled multicenter study of choline-stabilized orthosilicic acid in patients with symptomatic knee osteoarthritis, BMC Musculoskeletal Disorders, 18:2 DOI 10.1186/s12891-016-1370-7
Chiwele et al. 2000, The Shell dissolution of various empty hard capsules, Chem Pharm Bull, 48, 951.
Rabadiya et al. 2013, A review: capsule shell material from gelatin to non animal origin material, International Journal of Pharmaceutical Research and Bio-Science, 2, 42.
*Scientific opinion of the Panel on Food Additives and Nutrient Sources added to Food*: choline-stabilised orthosilicic acid added for nutritional purposes to feed supplements, *The EFSA Journal* (2009), 948, 1-23.

The invention claimed is:

1. A hard dietary or pharmaceutical capsule comprising a sealed hydroxypropylmethylcellulose capsule shell filled with an acidic liquid formulation consisting of silicic acid stabilized with a choline compound and 15-30 wt % water, the acidic liquid formulation having a pH in the range of 0 to 1.5, wherein when the sealed capsule stored for one month in an aluminum/aluminum sealed bag showed no leaks and a weight loss less than 0.03% when kept for two hours in a vacuum of 200 mbar.

2. The capsule of claim 1, wherein the stabilized silicic acid consists of monomers of silicic acid, oligomers of silicic acid, or combinations thereof.

3. The capsule of claim 1, wherein the choline compound is present in a concentration of at least 20 wt % of the liquid formulation.

4. The capsule of claim 1, wherein the formulation contains 15 wt % water.

5. The capsule of claim 1, wherein the formulation has a viscosity in the range of $0.08 \cdot 10^3$ to $2.0 \cdot 10^3$ mPas.

6. The capsule of claim 1, wherein the capsule is an inner capsule present within an outer capsule, and wherein the outer capsule further contains a pharmaceutically or dietary acceptable composition.

7. The capsule of claim 6, wherein the pharmaceutically or dietary acceptable composition is a liquid, hydrophobic formulation, and comprises an oil.

8. A method of preparation of a capsule, the method comprising the steps of:
preparing an acidic liquid formulation consisting of silicic acid stabilized with a choline compound and 15-30 wt % water, the acidic liquid formulation having a pH in the range of 0 to 1.5;
filling a hydroxypropylmethylcellulose capsule shell with the liquid formulation; and
sealing the capsule shell to obtain said capsule, wherein when the sealed capsule stored for one month in an aluminum/aluminum sealed bag showed no leaks and a weight loss less than 0.03% when kept for two hours in a vacuum of 200 mbar.

9. A silicon food supplement comprising the capsule of claim 1, wherein the silicon food supplement is for use as a source of silicon.

10. The capsule of claim 1, wherein the capsule is for use as a medicament.

11. The capsule of claim 10, wherein the capsule is for use in the prevention, inhibition or treatment of bone-loss, cartilage degeneration, loss of hair and nail quality and skin aging diseases.

12. The capsule of claim 6, wherein the dietary or pharmaceutically acceptable composition comprises a dietary or pharmaceutically active ingredient.

13. The capsule of claim 1, wherein the formulation contains 30 wt % water.

14. The capsule of claim 1, wherein the formulation contains 20 wt % water.

15. The capsule of claim 1, wherein the choline compound is selected from choline chloride, choline acetate, choline bitartrate, or choline hydroxide.

16. The method of claim 8, wherein the choline compound is selected from choline chloride, choline acetate, choline bitartrate, or choline hydroxide.

17. A capsule comprising
an inner capsule comprising a sealed capsule shell filled with an acidic liquid formulation comprising silicic acid stabilized with a choline compound, wherein the capsule shell comprises a polysaccharide and/or a polysaccharide derivative; and
an outer capsule enclosing the inner capsule, wherein the outer capsule further contains a pharmaceutically or dietary acceptable composition.

18. The capsule of claim 17, wherein the pharmaceutically or dietary acceptable composition is a liquid, hydrophobic formulation, and comprises an oil.

19. The capsule of claim 17, wherein the choline compound comprises choline chloride, choline acetate, choline bitartrate, or choline hydroxide.

20. A capsule comprising a sealed capsule shell filled with an acidic liquid formulation consisting of silicic acid stabilized with a choline compound and amorphous silica, wherein the capsule shell comprises a hydroxyalkylcellulose, a hydroxyalkylalkylcellulose, or a derivative thereof, wherein said alkyl is one or more of C1-C4 alkyl, and wherein the formulation has a viscosity in the range of $0.08 \cdot 10^3$ to $2.0 \cdot 10^3$ mPas.

21. The capsule of claim 1, wherein the liquid formulation contains 2.5-4% silicon by volume and 65-80% choline chloride by weight.

22. A hard dietary or pharmaceutical capsule comprising a sealed capsule shell filled with an acidic liquid formulation consisting of silicic acid stabilized with a choline compound and 15-30 wt % water, the acidic liquid formulation having a pH ranging from 0 to 1.5.

23. The capsule of claim 22, wherein the capsule opens in an aqueous acidic environment of the stomach and is for use as a medicament or food supplement.

24. The capsule of claim 22, wherein the capsule opens in an aqueous acidic environment of the stomach and is for use as a medicament or food supplement.

* * * * *